United States Patent [19]

Katamoto

[11] Patent Number: 5,686,378
[45] Date of Patent: Nov. 11, 1997

[54] LAMELLA LEPIDOCROCITE PARTICLES AND PROCESS FOR PRODUCING THE SAME

[75] Inventor: Tsutomu Katamoto, Hatsukaichi, Japan

[73] Assignee: Toda Kogyo Corporation, Hiroshima-ken, Japan

[21] Appl. No.: 498,277

[22] Filed: Jul. 3, 1995

[30] Foreign Application Priority Data

Jul. 4, 1994 [JP] Japan ................... 6-176014

[51] Int. Cl.⁶ ..................... B01J 23/745; B01J 21/06
[52] U.S. Cl. ..................... 502/338; 502/325; 502/326; 502/350
[58] Field of Search ................... 502/338, 350, 502/325, 326

[56] References Cited

U.S. PATENT DOCUMENTS 5,399,541  3/1995  Ishii et al. .................. 502/326

FOREIGN PATENT DOCUMENTS 0514177  11/1992  European Pat. Off. .......... C02F 1/72

OTHER PUBLICATIONS

Chemical Abstracts, vol. 93, No. 16, 20 Oct. 1980, Columbus, Ohio, US; Abstract No. 160327k, Solcova et al *Abstract* & Silikaty, vol. 0 24, No. 2, 1980, pp. 133–141.

Metal Uptake and Iron Titanium Oxide Biomineralization by Acidophilic Microorganisms in Mine–Waste Environments, Canadian Journal of Earth Sciences, Mann (1989) pp. 2731–2735.

*Primary Examiner*—Glenn A. Caldarola
*Assistant Examiner*—Alexander G. Ghyka
*Attorney, Agent, or Firm*—Nixon & Vanderhye P.C.

[57] ABSTRACT

The disclosure describes lamella lepidocrocite particles containing 10 to 30 atm % of titanium calculated as Ti/(Ti+Fe) and having a BET specific surface area of 150 to 350 m²/g.

7 Claims, 2 Drawing Sheets

(×50000)

LAMELLA LEPIDOCROCITE PARTICLES AND PROCESS FOR PRODUCING THE SAME

BACKGROUND OF THE INVENTION

The present invention relates to lamella lepidocrocite particles and a process for producing the same. More particularly, the present invention relates to lamella lepidocrocite particles ($\gamma$-FeOOH) for an oxidation catalyst for waste water treatment, which have a homogeneous composition, a large BET specific surface area, especially, a BET specific surface area of 150 to 350 $m^2$/g and an excellent heat resistance, and a process for producing lamella lepidocrocite particles.

The lamella lepidocrocite particles according to the present invention are mainly used as an iron material for an oxidation catalyst for waste water treatment or the like.

A large amount of waste water containing various components depending on the kind of industry is discharged from factories. As one of the conventional waste water treatment methods, a wet oxidation treatment process called Zimmermann's method is known. This method is put to practical use because it is advantageous in that organic substances are decomposed in a short time as compared with a biochemical method called an activated sludge process, and in that since it is not necessary to dilute waste water to a concentration which is suitable for the growth of bacteria, it is possible to miniaturize a waste water treatment facility.

A wet oxidation treatment process is a method of treating waste water so as to decompose the organic substances in the waste water by passing an oxygen-containing gas at a high temperature and under a high pressure which can maintain the liquid-phase state of the waste water.

In the wet oxidation process, various oxidation catalysts are used for the purpose of increasing the rate of reaction for decomposing the organic substances.

As the oxidation catalyst, the following catalysts (I) and (II) are put to practical use. The catalyst (I) is composed of a precious metal compound such as palladium and platinum which are carried on a carrier such as alumina, silica, silica gel and activated carbon.

The catalyst (II) (hereinunder referred to as "oxidation catalyst containing the components A and B") is composed of 90 to 99.95 wt % of an oxide (hereinunder referred to as "component A") comprising iron and at least one element (hereinunder referred to as "titanium, etc.") selected from the group consisting of titanium, silicon and zirconium, and 0.05 to 10 wt % of at least one element (hereinunder referred to as "component B") selected from the group consisting of cobalt, nickel, cerium, silver, gold, platinum, palladium, rhodium, ruthenium and iridium (Japanese Patent Application Laid-Open (KOKAI) No. 138027/1993). The said component A contains 4.95 to 95 wt % of iron as an oxide, 4.95 to 95 wt % of titanium, etc. as an oxide, and the total sum of the iron oxide and the oxide of titanium, etc. is 90 to 99.95 wt %.

The catalyst (II) is usable not only for waste water which does not contain a nitrogen-containing compound such as amine compound, amide compound and amino acid compound but also for waste water which contains those compounds, and it has an adequate treating capability in the COD (Cr) removal ratio, total nitrogen removal ratio, etc. as compared with the catalyst (I).

There is a tendency of the amount of waste water discharged from factories increasing more and more with the development of various industries, and efficient treatment of waste water is strongly demanded. In order to satisfy this demand, enhancement of the capability of an oxidation catalyst containing the components A and B is strongly demanded.

In order to enhance the capability of the oxidation catalyst containing the components A and B, it is necessary that the composition of the oxidation catalyst is as homogeneous as possible, and in order to increase the contact area of the oxidation catalyst with waste water as much as possible, it is necessary that the BET specific surface area of the oxidation catalyst is as large as possible.

An oxidation catalyst containing the components A and B is produced by heat-treating a mixture containing an iron oxide and an oxide of titanium, etc. in a predetermined weight ratio in a temperature range of about 300° to 750° C. to obtain an oxide containing iron and titanium, etc., and adding a molding assistant to the oxide containing iron and titanium, etc., mixing and kneading the oxide while adding an appropriate amount of water, molding the oxide into a predetermined shape, drying the molded material, heat-treating the molded material in a temperature range of 300° to 750° C. to obtain a molded product, impregnating the molded product with an aqueous solution of a metal salt as the component B, and further drying and heat-treating the molded product.

As described in the above process in detail, the properties of an oxidation catalyst containing the components A and B have a close relationship with the properties of an oxide containing iron and titanium, etc. which constitute a molded product to be impregnated with the component B. In other words, in order to obtain an oxidation catalyst containing the components A and B which has as homogeneous a composition as possible and as large a BET specific surface area as possible, it is necessary that the oxide containing iron and titanium, etc. has as homogeneous a composition as possible and as large a BET specific surface area as possible.

An oxide containing iron and titanium, etc. is conventionally produced, for example, by a method comprising the steps of mixing an iron oxide and an oxide of titanium, etc. by a dry process, drying the mixed particles and heat-treating the mixed particles at 300° to 750° C., or by a method comprising the steps of adding an aqueous alkali solution to a mixed solution of an aqueous solution containing ferric salt and an aqueous solution containing titanium, etc. to produce a coprecipitate from the aqueous solution, filtering the coprecipitate, washing it with water, drying and heat-treating it at 300° to 750° C.

In the case of obtaining the mixed particles of an iron oxide and an oxide of titanium, etc., the iron oxide particles used as an iron material of the oxidation catalyst are generally produced by passing an oxygen-containing gas into a suspension containing an iron-containing precipitate obtained by reacting an aqueous ferrous salt solution and an aqueous alkali solution, and the iron oxide particles of various iron compounds are produced depending on the temperature, the pH, and the presence or absence of an additive.

It is known that lepidocrocite ($\gamma$-FeOOH) is produced when an additive such as phosphate, oxycarboxylate and EDTA is added to an aqueous ferrous salt solution so as to allow an oxidation reaction under neutral or weak acid conditions.

Although an oxide containing iron and titanium, etc. which has as homogeneous a composition as possible and as large a BET specific surface area as possible is now in the strongest demand, no oxide containing iron and titanium, etc. at present sufficiently meets such a demand.

In the known process comprising the steps of mixing an iron oxide and an oxide of titanium, etc. by a dry process, and drying and heat-treating the mixed particles at 300° to 750° C., it is difficult to homogeneously mix the iron oxide and the oxide of titanium, etc., so that the composition of the mixed particles of iron oxide and the oxide of titanium are apt to lack in homogeneity. The BET specific surface area of an iron oxide as the raw material of the oxidation catalyst is generally as small as about 2 to 20 $m^2/g$ in the case of granular magnetite particles or hematite particles, 10 to 100 $m^2/g$ in the case of acicular ferric hydrated oxide particles, and 10 to 60 $m^2/g$ in the case of acicular magnetite particles, maghemite particles and hematite particles, so that when such iron oxide particles are heated to 300° to 750° C., especially to not lower than 500° C., sintering causes in and between particles, and as a result, the BET specific surface area further lowers.

In the above-described known process comprising the steps of filtering the coprecipitate produced from an aqueous solution, washing it with water, drying and heat-treating it at 300° to 750° C., since the precipitate containing iron and titanium, etc. is produced from an aqueous solution, the oxide having a homogeneous composition is more easily obtained than in a dry mixing process. However, as is known, a coprecipitate precipitates as granular fine particles, when the granular fine particles are heated to 300° to 750° C., especially to not lower than 500° C., sintering causes in and between particles because granular fine particles have large contacting points. As a result, the BET specific surface area greatly lowers, and it is impossible to obtain a mixed oxide containing iron and titanium, etc. having a large BET specific surface area.

According to the known method of producing lepidocrocite particles, particles having a large BET specific surface area are obtained, but the particles are granular fine particles in the same way as the above-described coprecipitate. Therefore, when the lepidocrocite particles are heated to 300° to 750° C., especially to not lower than 500° C., sintering is apt to be caused in and between particles, the BET specific surface area greatly lowers, and it is impossible to obtain a mixed oxide containing iron and titanium, etc. having a large BET specific surface area.

It is, therefore, eagerly expected to provide an iron-based material of the oxidation catalyst, which has as homogeneous a composition as possible, as large a BET specific surface area as possible, such an excellent heat resistance that even if the material is heat-treated at a high temperature such as 300° to 750° C., especially at a temperature of not lower than 500° C., the BET specific surface area is large, especially not less than 95 $m^2/g$ As a result of studies undertaken by the present inventors, it has been found that by reacting an aqueous ferrous salt solution, an aqueous titanium solution containing 10 to 30 atm % of titanium [calculated as Ti/(Ti+FE)] based on the Fe in the aqueous ferrous salt solution and an aqueous alkali carbonate solution to form an iron-containing precipitate containing titanium, and oxidizing the resultant suspension containing the precipitate in a temperature range of 5° to 40° C. by passing an oxygen-containing gas thereinto while maintaining the pH of the suspension at 8.0 to 10.0, the obtained lamella lepidocrocite particles have a homogeneous composition, a large BET specific surface area, especially a BET specific surface area of 150 to 350 $m^2/g$, and an excellent heat resistance. On the basis of this finding, the present invention has been achieved.

SUMMARY OF THE INVENTION

In a first aspect of the present invention, there are provided lamella lepidocrocite particles containing 10 to 30 atm % of titanium [calculated as Ti/(Ti+Fe)] and having a BET specific surface area of 150 to 350 $m^2/g$.

In a second aspect of the present invention, there is provided a process for producing lamella lepidocrocite particles, comprising the steps of:

reacting an aqueous ferrous salt solution, an aqueous titanium solution containing 10 to 30 atm % of titanium, calculated as Ti/(Ti+Fe), based on the Fe in said aqueous ferrous salt solution, and an aqueous alkali carbonate solution, to form an iron-containing precipitate containing titanium; and oxidizing the resultant suspension containing said precipitate in a temperature range of 5° to 40° C. by passing an oxygen-containing gas thereinto while maintaining the pH of said suspension at 8.0 to 10.0.

In a third aspect of the present invention, there is provided lamella lepidocrocite particles containing 10 to 30 atm % of titanium [calculated as Ti/(Ti+Fe)] and having a BET specific surface area of 150 to 350 $m^2/g$, produced by a process comprising the steps of:

reacting an aqueous ferrous salt solution, an aqueous titanium solution containing 10 to 30 atm % of titanium, calculated as Ti/(Ti+Fe), based on the Fe in said aqueous ferrous salt solution, and an aqueous alkali carbonate solution, to form an iron-containing precipitate containing titanium; and oxidizing the resultant suspension containing said precipitate in a temperature range of 5° to 40° C. by passing an oxygen-containing gas thereinto while maintaining the pH of said suspension at 8.0 to 10.0.

DETAILED DESCRIPTION OF THE INVENTION

Figure 1:
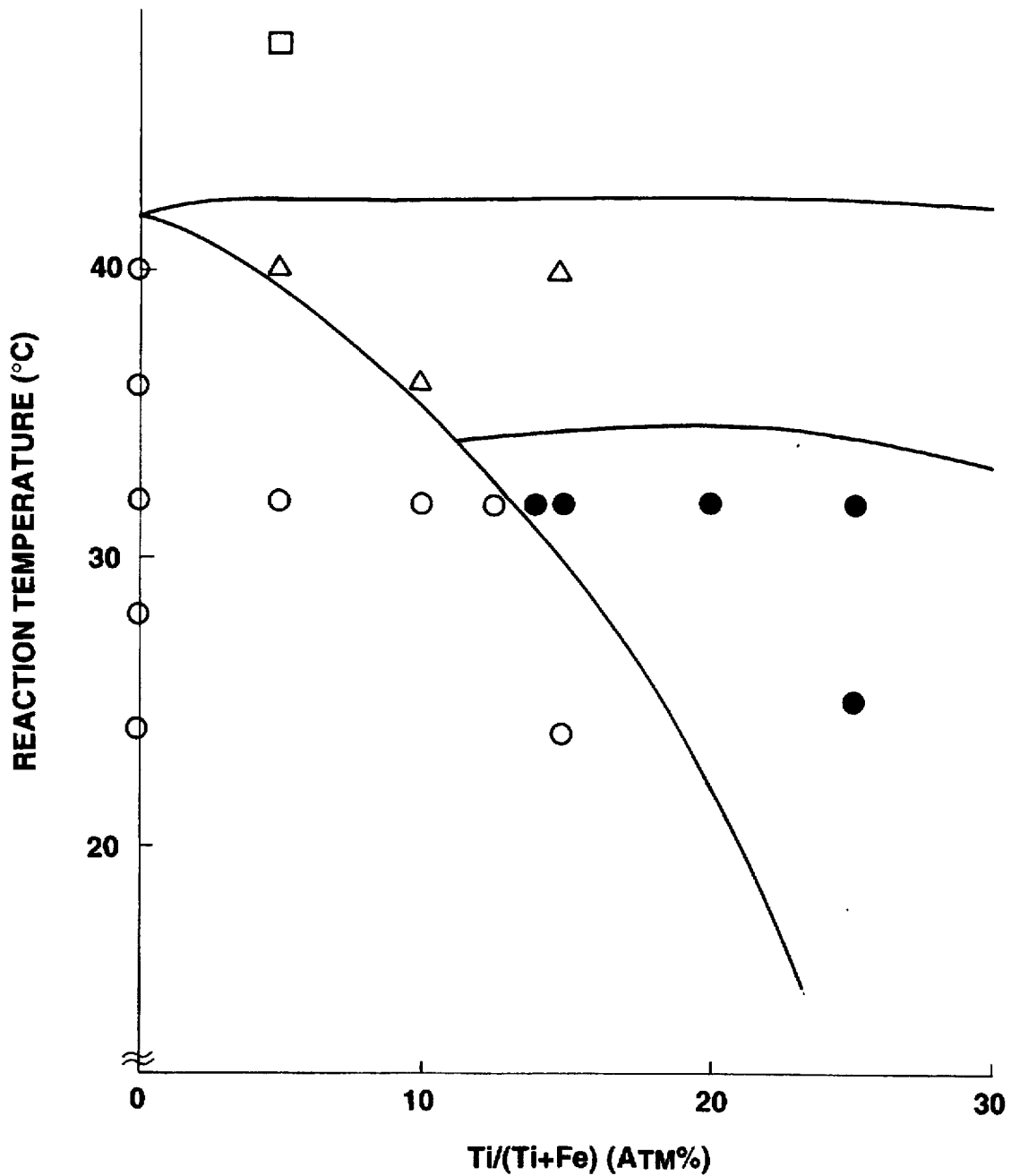
FIG. 1 shows the kinds of products obtained in the same procedure as in Example 1 except for varying the amount of titanium added and the reaction temperature.

Lepidocrocite particles according to the present invention will first be described.

The lepidocrocite particles according to the present invention are lamella and have a BET specific surface area of 150 to 350 $m^2/g$. Lepidocrocite particles having a BET specific surface area of less than 150 $m^2/g$ are also obtained, but when they are heat-treated at a high temperature, especially at 500° C., the BET specific surface area unfavorably lowers to not more than 95 $m^2/g$, so that they are not favorable as an iron material for an oxidation catalyst. Lepidocrocite particles having a BET specific surface area of more than 350 $m^2/g$ are also obtained, but the particles are so fine that it is difficult to filter the lepidocrocite particles from the reaction mother liquid so as to separate them and to wash the particles with water, so that such particles are not industrially advantageous.

The lamella lepidocrocite particles according to the present invention have an approximately rectangular plate-like surface, and the average major axial particle diameter is 0.05 to 0.2 μm, the average minor axial particle diameter is 0.01 to 0.05 μm, and the thickness is 30 to 100 Å. When the BET specific surface area and the heat resistance of lamella lepidocrocite particles are taken into consideration, the average major axial particle diameter is preferably 0.08 to 0.15 μm, the average minor axial particle diameter is preferably 0.02 to 0.05 μm, and the thickness is preferably 30 to 70 Å.

The lamella lepidocrocite particles according to the present invention contain 10 to 30 atm % of titanium [calculated as Ti/(Ti+Fe)]. The lamella lepidocrocite particles according to the present invention homogeneously contain titanium and have a homogeneous composition as is obvious from the result of X-ray diffraction in later-described Example 1 in which only γ-FeOOH type peaks are recognized.

If the titanium content is less than 10 atm % [calculated as Ti/(Ti+Fe)], the heat resistance is unfavorable. On the other hand, if the titanium content exceeds 30 atm %, lepidocrocite particles containing titanium are mixed with a large amount of $TiO_2 \cdot H_2O$ particles produced as a by-product, so that the composition cannot be said to be homogeneous.

An oxidation catalyst for waste water treatment will be described.

The oxidation catalyst is produced by heat-treating a mixture containing the lamella lepidocrocite particles and if necessary, an oxide of at least one element selected from the group consisting of titanium, silicon and zirconium in a predetermined weight ratio, in a temperature range of about 300° to 750° C., adding a molding assistant to the obtained oxides, mixing and kneading the oxides while adding an appropriate amount of water, molding the oxides into a predetermined shape, drying the obtained molded material, heat-treating the molded material in a temperature range of 300° to 750° C., impregnating the obtained molded product with an aqueous solution of a metal salt of at least one selected from the group consisting of cobalt, nickel, cerium, silver, gold, platinum, palladium, rhodium, ruthenium and iridium, and further drying and heat-treating the treated molded product.

The oxidation catalyst for waste water treatment comprises 90 to 99.95 wt % of the oxides composed of an iron oxide derived from the lamella lepidocrocite particles according to the present invention and if necessary, an oxide of at least one element selected from the group consisting of titanium, silicon and zirconium, and 0.05 to 10 wt % of at least one element selected from the group consisting of cobalt, nickel, cerium, silver, gold, platinum, palladium, rhodium, ruthenium and iridium. The said oxides contains 4.95 to 95 wt % of iron as an oxide, 4.95 to 95 wt % of titanium, silicon and zirconium as an oxide, and the total sum of the iron oxide and the oxide of titanium, silicon and zirconium is 90 to 99.95 wt % based on the oxidation catalyst.

A process for producing lepidocrocite particles according to the present invention will now be described.

As the aqueous ferrous salt solution in the present invention, an aqueous ferrous sulfate solution, an aqueous ferrous chloride solution, etc. are usable.

As the aqueous titanium solution in the present invention, an aqueous titanyl sulfate solution, an aqueous titanium tetrachloride solution, an aqueous titanium trichloride solution, etc. are usable.

The amount of aqueous titanium solution used is 10 to 30 atm % [calculated as Ti/(Ti+Fe)] based on the Fe in the aqueous ferrous salt solution. If it is less than 10 atm %, it is impossible to obtain lepidocrocite particles containing titanium having a large BET specific surface area, especially a BET specific surface area of not less than 150 m²/g. On the other hand, if it exceeds 30 atm %, lepidocrocite particles containing titanium are mixed with a large amount of $TiO_2 \cdot H_2O$ particles produced as a by-product.

As the aqueous alkali carbonate solution in the present invention, an aqueous sodium carbonate solution, an aqueous potassium carbonate solution, etc. are usable.

The order of mixing an aqueous ferrous salt solution, an aqueous titanium solution and an aqueous alkali carbonate solution is not restricted, and they may also be mixed simultaneously. However, since a titanium compound is difficult to solve when the pH is not less than 8.0, it is most preferable that an aqueous titanium solution is first mixed with an aqueous ferrous salt solution, and the resultant solution is added to an aqueous alkali carbonate solution in consideration of the homogeneity of the composition.

The pH of the suspension in which an iron-containing precipitate containing titanium is produced is adjusted to 8.0 to 10.0. If the pH is less than 8.0, the $CO_3^{2-}$ ion concentration in the reaction solution becomes so small that it is impossible to obtain lepidocrocite particles containing titanium. If the pH exceeds 10.0, lepidocrocite particles containing titanium are mixed with acicular goethite particles produced as a by-product.

The temperature of the suspension in which an iron-containing precipitate containing titanium is produced is in the range of 5° to 40° C. Even if the temperature is lower than 5° C., lepidocrocite particles containing titanium are produced, but it is neither industrially advantageous nor economical. If the temperature exceeds 40° C., lepidocrocite particles containing titanium are mixed with acicular goethite particles produced as a by-product.

The suspension in which an iron-containing precipitate containing titanium is produced is oxidized by passing an oxygen-containing gas (e.g., air) into the suspension.

The air flow rate is different depending upon the volume of the reaction solution, the concentration of iron, the reaction temperature, the method of passing air, etc. If the volume of the reaction solution and the method of passing air are the same, it is necessary to increase the air flow rate in order to produce lepidocrocite particles containing titanium as more as the concentration of iron increases and the reaction temperature is elevated.

The oxidation reaction rate of ferrous iron in the present invention is preferably 0.05 to 0.25 M/hr. If the oxidation reaction rate is too high, hydrotalcite-type particles are apt to be produced as a by-product in addition to lepidocrocite particles containing titanium. If the oxidation reaction rate is too low, acicular goethite particles are apt to be produced as a by-product in addition to lepidocrocite particles containing titanium.

The pH of the suspension during the oxidation reaction in the present invention is in the range of 8.0 to 10.0. If the pH is less than 8.0, the $CO_3^{2-}$ ion concentration in the reaction solution becomes so small that it is impossible to obtain lepidocrocite particles containing titanium. If the pH exceeds 10.0, lepidocrocite particles containing titanium are mixed with acicular goethite particles produced as a by-product.

The $CO_3^{2-}$ ion concentration is preferably not less than 1.5 [calculated as the molar ratio of $Na_2CO_3/(Ti+Fe)$]. The higher the $CO_3^{2-}$ ion concentration is, the larger the range in which lepidocrocite particles containing titanium are produced is apt to be. From the viewpoint of economy, the upper limit of the $CO_3^{2-}$ ion concentration is preferably about 4.0 [calculated as the molar ratio of $Na_2CO_3/(Ti+Fe)$].

The temperature of the suspension during the oxidation reaction is in the range of 5° to 40° C. Even if the temperature is lower than 5° C., lepidocrocite particles containing titanium are produced, but it is neither industrially advantageous nor economical. If the temperature exceeds 40° C., lepidocrocite particles containing titanium are mixed with acicular goethite particles produced as a by-product.

What is most important in the present invention is the fact that when an iron-containing precipitate containing titanium is produced by reacting an aqueous ferrous salt solution, an aqueous titanium solution containing titanium of 10 to 30 atm % [calculated as Ti/(Ti+Fe)] based on the Fe in the aqueous ferrous salt solution and an aqueous alkali carbonate solution, and the suspension containing the precipitate is then oxidized in a temperature range of 5° to 40° C. by passing an oxygen-containing gas thereinto while maintaining the pH of the suspension at 8.0 to 10.0, it is possible to obtain lamella lepidocrocite particles containing titanium which have a BET specific surface area of 150 to 350 m²/g, which contain 10 to 30 atm % of titanium [calculated as Ti/(Ti+Fe)], and that such lepidocrocite particles have a homogeneous composition, a large BET specific surface area and an excellent heat resistance.

Since the lepidocrocite particles containing titanium according to the present invention are produced from an aqueous solution, as seen from the later-described examples, the composition is homogeneous. Although the size of the plate-like surface is larger than the known coprecipitate or lepidocrocite particles in the prior art, the thickness of a particle is thin, so that the BET specific surface area is large. In addition to the large BET specific surface area, the contact points with respect to other particles are few due to the lamella shape, so that the lepidocrocite particles have an excellent heat resistance. In this way, according to the present invention, it is possible to obtain oxide (hematite) particles containing iron and titanium having a large BET specific surface area even if they are heated to 300° to 750° C., especially to a high temperature such as not lower than 500° C.

The lepidocrocite particles containing titanium according to the present invention dehydrate and transform into hematite particles at about 250° C.

From many experiments carried out by the present inventors, the following will be explained.

FIG. 1 shows the kinds of products obtained under the same conditions as in Example 1 except for varying the amount of titanium added in the range of 0 to 30 atm % [calculated as Ti/(Ti+Fe)], and the reaction temperature. The conditions are that the concentration of (Ti+Fe) is 0.3 mol/l, the molar ratio of $Na_2CO_3/(Ti+Fe)$ is 3.0, the air flow rate during oxidation is 40 l/min.

In FIG. 1, the mark: ● represents a region in which lepidocrocite (γ-FeOOH) particles are produced, the mark: ○ represents a region in which plate-like hydrotalcite particles containing titanium are produced, the mark: Δ represents a region in which a mixture of acicular goethite (α-FeOOH) particles containing titanium and lepidocrocite (γ-FeOOH) particles containing titanium is produced and the mark: □ represents a region in which acicular goethite (α-FeOOH) particles containing titanium are produced.

As shown in FIG. 1, the lepidocrocite particles containing titanium are produced when the amount of titanium added is about not less than 10 atm % [calculated as Ti/(Ti+Fe)]

In the lamella lepidocrocite particles according to the present invention, the value of the BET specific surface area when heat-treated at 300° C. for 60 minutes is more than 140 m²/g, and the value of the BET specific surface area when heat-treated at 500° C. for 60 minutes is more than 95 m²/g. That is, the lamella lepidocrocite particles of the present invention have an excellent heat resistance.

Since the lamella lepidocrocite particles of the present invention have a homogeneous composition and a large specific surface area, especially a BET specific surface area of 150 to 350 m²/g and an excellent heat resistance, as shown in later-described examples, the lamella lepidocrocite particles are suitable as an iron material for an oxidation catalyst for waste water treatment.

Since the lepidocrocite particles of the present invention have the above-described properties the oxide (hematite, α-$Fe_2O_3$) particles containing iron and titanium obtained by heat-treating the lepidocrocite particles also have a homogeneous composition and a large BET specific surface area. Therefore, a catalyst obtained by producing a molded product from the hematite particles and impregnating the molded product with the component B also have a homogeneous composition and a large BET specific surface area, so that the enhancement of the capability of the catalyst such as an improvement of the COD (Cr) removal ratio and the total nitrogen removal ratio, and an improvement of the catalyst life (durability) can be expected.

Since the lamella lepidocrocite particles of the present invention are an oxide, the lamella lepidocrocite particles are stable to oxidation by air and the like, and since the lamella lepidocrocite particles assume a yellowish brown color and have transparency due to the fine particle size, the lamella lepidocrocite particles can be expected to be used as a material of coatings, resin coatings, printing ink, coloring agents for cosmetics, etc.

In addition, since the lamella lepidocrocite particles of the present invention are an oxide containing titanium and iron in the form of a solid solution, there are many strong acidic point on the surfaces of the particles, and the degree of strong acidity is high, they are also expected to be used as a catalyst for isomerization for, for example, butene.

EXAMPLES

The present invention will be explained in more detail hereinunder with reference to the following examples and comparative examples.

In the following examples and comparative examples, the shape of a particle, the average major axial diameter and the average minor axial diameter of the plate-like surface of particles are expressed by the average values measured in transmission electron microphotographs, and the thickness of a particle is expressed by the value obtained from the half-width of the crystal plane (020) by using Scherrer formula.

The BET specific surface area of particle is expressed by the value measured by a BET method.

The Ti content in the lepidocrocite particles is expressed by the value measured by fluorescent X-ray spectroscopy.

Example 1

5 liter of a mixed aqueous solution having a temperature of 32° C. and composed of 0.51 mol/l of ferrous sulfate and 0.09 mol/l [which corresponds to 15 atm % calculated as Ti/(Ti+Fe)] of titanyl sulfate was added to 5 liter of an aqueous solution of 1.8 mol/l of sodium carbonate [which corresponds to 3.0 in a molar ratio calculated as Na$_2$CO$_3$/(Ti+Fe)] having a temperature of 34° C. in 5 minutes, thereby obtaining a suspension containing an iron-containing precipitate containing titanium. The pH of the suspension was 9.6.

The suspension was oxidized by blowing air at a rate of 40 l/min while maintaining the reaction temperature at 32° C., thereby producing a yellowish brown precipitate. The pH of the suspension during the oxidation reaction was in the range of 9.6 to 8.8.

Figure 2:
FIG. 2 is an electron micrograph (× 50000) showing the structure of the lepidocrocite particles containing titanium obtained in Example 1.

After the completion of the reaction, the yellowish brown precipitate was washed and dried at 120° C. for 12 hours to obtain yellowish brown particles. The particles obtained were lamella particles having an average major axial diameter of 0.1 μm, an average minor axial diameter of 0.03 μm on a plate-like surface, and a thickness of 40 Å, as shown in the electron micrograph (x 50000) in FIG. 2. The structure of the particles was γ-FeOOH type, as shown in the X-ray diffraction pattern in FIG. 3, and proved to be lepidocrocite particles. The BET specific surface area of the lepidocrocite particles was 230 m$^2$/g and the lepidocrocite particles contained 15.1 atm % of titanium [calculated as Ti/(Ti+Fe)] according to fluorescent X-ray spectroscopy.

Figure 3:
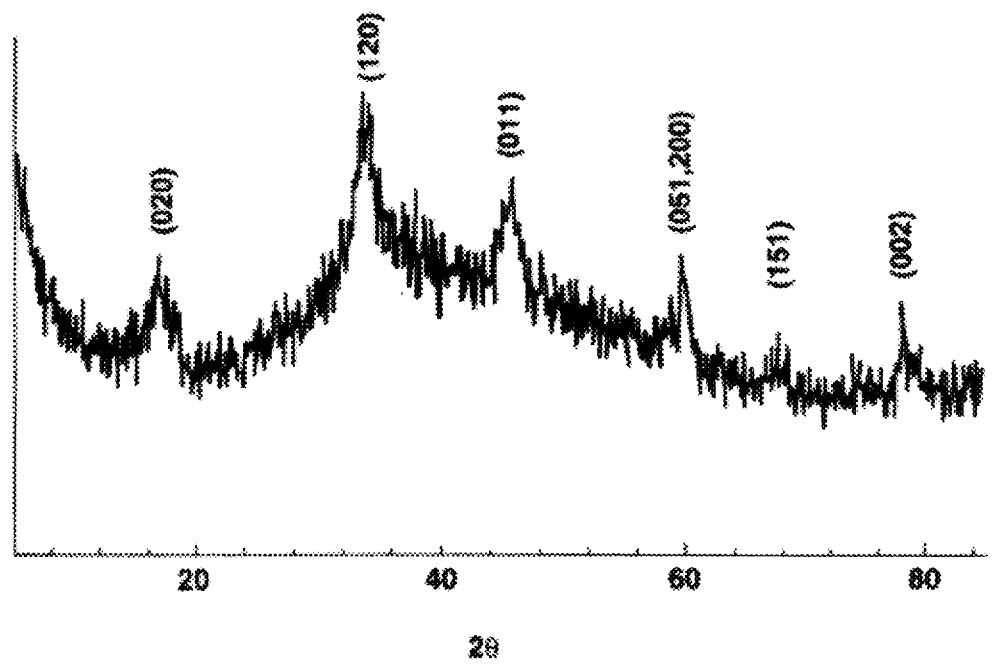
FIG. 3 is an X-ray diffraction pattern of the lepidocrocite particles containing titanium obtained in Example 1.

Although the obtained particles contained titanium, since only the peaks of lepidocrocite (γ-FeOOH) were recognized and no peak of titanium was recognized in the X-ray diffraction pattern in FIG. 3, the particles proved to have a homogeneous composition.

The BET specific surface area of the particles when they were heat-treated at 300° C. for 60 minutes was 150 m$^2$/g, and the BET specific surface area of the particles when they were heat-treated at 500° C. for 60 minutes was 112 m$^2$/g. In both cases, the BET specific surface area was as large as not less than 95 m$^2$, which proved that the lepidocrocite particles produced had an excellent heat resistance.

Examples 2 to 9, Comparative Examples 1 to 3

Products were obtained in the same procedure as in Example 1 except for varying the kind, the concentration and the temperature of an aqueous alkali carbonate solution, the kind, the concentration and the temperature of an aqueous ferrous salt solution, the kind, the concentration and the temperature of an aqueous titanium solution, the pH and the temperature of the suspension, and the oxidation reaction rate and the pH in the oxidation reaction.

The main producing conditions and the properties of the products are shown in Tables 1 and 2.

Since only the peaks of γ-FeOOH were recognized in X-ray diffraction, the particles obtained in Examples 2 to 9 proved to be lepidocrocite particles. The shape of the lepidocrocite particles was found to be a lamella by observation through an electron microscope Since the peaks of α-FeOOH were recognized in X-ray diffraction and acicular particles were observed through an electron microscope, the particles obtained in Comparative Example 1 proved to be acicular γ-FeOOH particles.

Since the peaks of α-FeOOH and γ-FeOOH were recognized in X-ray diffraction and acicular particles and lamella particles were observed through an electron microscope, the particles obtained in Comparative Example 2 proved to be a mixture of acicular α-FeOOH particles and lamella γ-FeOOH particles.

Since the hydrotalcite-type peaks were recognized in X-ray diffraction, and lamella particles were observed through an electron microscope, the particles obtained in Comparative Example 3 proved to be lamella hydrotalcite particles. The particles obtained in Example 3 were dried at 60° C.

TABLE 1

| Example and Comparative Example | Production of lepidocrocite particles Aqueous alkali carbonate solution | | |
|---|---|---|---|
| | Kind | Concentration (mol/l) | Temperature (°C.) |
| Ex. 1 | Na$_2$CO$_3$ | 1.8 | 34 |
| Ex. 2 | Na$_2$CO$_3$ | 1.5 | 32 |
| Ex. 3 | Na$_2$CO$_3$ | 1.2 | 26 |
| Ex. 4 | Na$_2$CO$_3$ | 2.0 | 20 |
| Ex. 5 | Na$_2$CO$_3$ | 2.1 | 38 |
| Ex. 6 | Na$_2$CO$_3$ | 2.3 | 32 |
| Ex. 7 | K$_2$CO$_3$ | 1.8 | 34 |
| Ex. 8 | K$_2$CO$_3$ | 2.5 | 18 |
| Ex. 9 | K$_2$CO$_3$ | 2.5 | 38 |
| Comp. Ex. 1 | Na$_2$CO$_3$ | 1.8 | 45 |
| Comp. Ex. 2 | Na$_2$CO$_3$ | 1.8 | 42 |
| Comp. Ex. 3 | Na$_2$CO$_3$ | 1.8 | 32 |

| Example and Comparative Example | Production of lepidocrocite particles Aqueous ferrous salt solution | | |
|---|---|---|---|
| | Kind | Concentration (mol/l) | Temperature (°C.) |
| Ex. 1 | FeSO$_4$ | 0.51 | 32 |
| Ex. 2 | FeSO$_4$ | 0.51 | 30 |
| Ex. 3 | FeSO$_4$ | 0.51 | 24 |
| Ex. 4 | FeSO$_4$ | 0.65 | 18 |
| Ex. 5 | FeSO$_4$ | 0.65 | 38 |
| Ex. 6 | FeCl$_2$ | 0.40 | 32 |
| Ex. 7 | FeCl$_2$ | 0.51 | 32 |
| Ex. 8 | FeCl$_2$ | 0.51 | 14 |
| Ex. 9 | FeCl$_2$ | 0.40 | 39 |
| Comp. Ex. 1 | FeSO$_4$ | 0.51 | 45 |
| Comp. Ex. 2 | FeSO$_4$ | 0.51 | 41 |
| Comp. Ex. 3 | FeSO$_4$ | 0.51 | 31 |

| Example and Comparative Example | Production of lepidocrocite particles Aqueous titanium solution | | | |
|---|---|---|---|---|
| | Kind | Concentration (mol/l) | Temperature (°C.) | Ti/(Ti + Fe) (atm %) |
| Ex. 1 | TiOSO$_4$ | 0.09 | 32 | 15.0 |
| Ex. 2 | TiOSO$_4$ | 0.09 | 30 | 15.0 |
| Ex. 3 | TiOSO$_4$ | 0.09 | 24 | 15.0 |
| Ex. 4 | TiOSO$_4$ | 0.20 | 18 | 23.5 |
| Ex. 5 | TiOSO$_4$ | 0.09 | 38 | 12.2 |
| Ex. 6 | TiCl$_4$ | 0.14 | 32 | 25.9 |
| Ex. 7 | TiCl$_4$ | 0.09 | 32 | 15.0 |
| Ex. 8 | TiCl$_4$ | 0.09 | 16 | 15.0 |
| Ex. 9 | TiOSO$_4$ | 0.09 | 39 | 18.4 |
| Comp. Ex. 1 | TiOSO$_4$ | 0.09 | 45 | 15.0 |
| Comp. Ex. 2 | TiOSO$_4$ | 0.09 | 41 | 15.0 |
| Comp. Ex. 3 | TiOSO$_4$ | 0.05 | 31 | 9.1 |

TABLE 2

| Examples and Comparative Examples | Properties of particles produced | | Particle size Major axial diameter on the plate-like surface (μm) |
|---|---|---|---|
| | X-ray diffraction | Shape | |
| Ex. 1 | γ-FeOOH | Lamella | 0.10 |
| Ex. 2 | γ-FeOOH | Lamella | 0.11 |
| Ex. 3 | γ-FeOOH | Lamella | 0.09 |
| Ex. 4 | γ-FeOOH | Lamella | 0.08 |
| Ex. 5 | γ-FeOOH | Lamella | 0.13 |
| Ex. 6 | γ-FeOOH | Lamella | 0.10 |
| Ex. 7 | γ-FeOOH | Lamella | 0.11 |
| Ex. 8 | γ-FeOOH | Lamella | 0.07 |
| Ex. 9 | γ-FeOOH | Lamella | 0.09 |
| Comp. Ex. 1 | α-FeOOH | Acicular | 0.22 |
| Comp. Ex. 2 | α-FeOOH + γ-FeOOH | Acicular + lamella | — |
| Comp. Ex. 3 | Hydrotalcite type | Lamella | 0.26 |

| Examples and Comparative Examples | Properties of particles produced | | |
|---|---|---|---|
| | Particle size | | |
| | Minor axial diameter on the plate-like surface (μm) | Thickness (Å) | BET specific surface area (m²/g) |
| Ex. 1 | 0.03 | 40 | 230 |
| Ex. 2 | 0.03 | 42 | 220 |
| Ex. 3 | 0.02 | 37 | 290 |
| Ex. 4 | 0.02 | 34 | 310 |
| Ex. 5 | 0.04 | 46 | 205 |
| Ex. 6 | 0.03 | 38 | 240 |
| Ex. 7 | 0.03 | 41 | 225 |
| Ex. 8 | 0.02 | 33 | 303 |
| Ex. 9 | 0.03 | 43 | 215 |
| Comp. Ex. 1 | 0.04 | 200 | 85.3 |
| Comp. Ex. 2 | — | — | 145 |
| Comp. Ex. 3 | 0.26 | 300 | 220 |

| Examples and Comparative Examples | Properties of particles produced | Heat resistance of product | |
|---|---|---|---|
| | Ti content Ti/(Ti + Fe) (atm %) | BET specific surface area of particles burned at 300° C. (m²/g) | BET specific surface area of particles burned at 500° C. (m²/g) |
| Ex. 1 | 15.1 | 150 | 112 |
| Ex. 2 | 15.0 | 145 | 103 |
| Ex. 3 | 15.0 | 175 | 131 |
| Ex. 4 | 23.6 | 190 | 144 |
| Ex. 5 | 12.3 | 143 | 98 |
| Ex. 6 | 25.8 | 153 | 109 |
| Ex. 7 | 15.0 | 151 | 109 |
| Ex. 8 | 15.0 | 184 | 138 |
| Ex. 9 | 18.4 | 165 | 115 |
| Comp. Ex. 1 | 15.0 | 80.3 | 46.7 |
| Comp. Ex. 2 | 15.1 | 121 | 67.2 |
| Comp. Ex. 3 | 9.1 | 135 | 85.2 |

What is claimed is:

1. An oxidation catalyst for waste water treatment comprising 90 to 99.95 wt % of oxides comprising iron and titanium containing lamella lepidocrocite particles containing 10 to 30 atm % titanium, calculated as Ti/(Ti+Fe), and having a BET specific surface area of 150 to 350 m²/g, and 0.05 to 10 wt % of at least one element selected from the group consisting of cobalt, nickel, cerium, silver, gold, platinum, palladium, rhodium, ruthenium and iridium.

2. The oxidation catalyst for waste water treatment according to claim 1, wherein the lamella lepidocrocite particles have an average major axial diameter of 0.05 to 0.2 μm, a average minor axial diameter of 0.01 to 0.05 μm, and a thickness of 30 to 100 Å.

3. The oxidation catalyst for waste water treatment according to claim 1, wherein the lamella lepidocrocite particles have an average major axial diameter of 0.08 to 0.15 μm, an average minor axial diameter of 0.02 to 0.05 μm, and a thickness of 30 to 70 Å.

4. Lamella lepidocrocite particles containing titania of 10 to 30 atm %, calculated as Ti/(Ti+fe), and having a BET specific surface area of 150 to 350 m²/g, an average major axial diameter of 0.05 to 0.2 μm, an average minor axial diameter of 0.01 to 0.05 μm and a thickness of 30 to 100 Å.

5. Lamella lepidocrocite particles according to claim 4, wherein the average major axial diameter is 0.08 to 0.15 μm, the average minor axial diameter is 0.02 to 0.05 μm, and the thickness is 30 to 70 Å.

6. A process for producing lamella lepidocrocite particles, comprising the steps of:

reacting an aqueous ferrous salt solution, an aqueous titanium solution containing 10 to 30 atm % of titanium, calculated as Ti/(Ti+Fe), based on the Fe in said aqueous ferrous salt solution, and an aqueous alkali carbonate solution, to form an iron-containing precipitate containing titanium; and oxidizing the resultant suspension containing said precipitate in a temperature range of 5° to 40° C. by passing an oxygen-containing gas thereinto while maintaining the pH of said suspension at 8.0 to 10.0.

7. Lamella lepidocrocite particles produced by the process of claim 6.

* * * * *